Patented July 18, 1939

2,166,120

UNITED STATES PATENT OFFICE 2,166,120

INSECTICIDAL COMPOSITION

Euclid W. Bousquet, Wilmington, Del., assignor to E. I. du Pont de Nemours & Company, Wilmington, Del., a corporation of Delaware No Drawing. Application August 12, 1937, Serial No. 158,704

24 Claims. (Cl. 167—22)

This invention relates to compositions of matter useful in controlling and combatting insect pests and is particularly directed to insecticidal spray compositions useful as fly killers containing pyrethrum and an amide of a carboxylic or thiocarboxylic acid, which amides may be considered comprehensively as those containing amido carbon. For simplicity, I shall refer to such amides hereinafter as aciamides.

Pyrethrum extracts now in current use have excellent toxic properties, particularly with respect to paralysis of flies. While these extracts are exceptionally well-suited for the control of house flies, they are quite expensive. Consequently various synthetic products have been proposed as pyrethrum substitutes. Most such products, however, require such large concentrations for effective control as to deposit an objectionable amount of residue. Moreover, because of the large concentrations required, they offer little economic advantage.

I have found that, when aciamides and pyrethrum are blended in a mutual solvent, a synergistic effect is obtained, that is the toxicity of the resulting composition is higher than would be expected from a consideration of the toxicities of the pyrethrum and amide. Thus I conceive of my invention as insecticidal spray solutions having dissolved therein pyrethrum and an aciamide. While I do not wish to be confined to any theory of the invention, it is my belief that at least one of the factors responsible for this synergistic effect just noted is the presence of amido carbon joined to amido nitrogen.

As the solvents used in pyrethrum fly sprays are usually of the hydrocarbon type such as kerosene or other suitable blends of hydrocarbons either alone or mixed with other solvents having greater solvent power for pyrethrum, I prefer to employ aciamides which are soluble in such hydrocarbon solvents. Other solvents may be used for such aciamides as are not appreciably soluble in hydrocarbon solvents, but as the general rule, other commercially available organic solvents are not so suitable for use in fly sprays.

Amides having the property of synergistically modifying the toxicity of pyrethrum sprays may be used advantageously for improving the toxicity of standard pyrethrum sprays. Such sprays usually contain about one hundred milligrams of pyrethrum per 100 cc. of kerosene. I have found it more advantageous and economical, however, to employ the amide as a substitute for a portion of the pyrethrum. When pyrethrum sprays containing less than optimum concentrations of pyrethrum, even as low as one-fourth of the customary amount, are fortified with an aciamide, the toxicity of the resulting solution is far superior to the toxicity of corresponding solutions containing pyrethrum or the amide alone. The boosting effect of aciamides on the toxicity of pyrethrum sprays is greater than would be expected from a simple mixture of two toxic principals as even amides having relatively inferior toxic properties may be combined with pyrethrum.

The superior toxicity of the aciamide-pyrethrum mixtures is also evidenced by the fact that analogous compositions containing, in place of the aciamide, the corresponding acid salts show little or no improvement in toxicity. While the amide and salt may both be considered as derivatives of the acid and the appropriate nitrogen base (ammonia or amines) they are in fact quite different types of compounds as is evident from a consideration of their chemical structure and physical properties. In the amide the amido nitrogen is trivalent and is linked directly with the amido carbon, whereas in the salt the nitrogen is pentavalent and is linked to carbon through oxygen. These and other factors confirm my belief that the direct primary linkage between amido nitrogen and amido carbon is one of the factors responsible for the synergistic effect I have mentioned.

Mixtures of pyrethrum with all aciamides do not show the same degree of toxicity and synergism, and the amides should accordingly be employed in proper concentrations and should be selected with appropriate reference to their solubility in pyrethrum solvents. The less effective aciamides such as the simple amides of low molecular weight must be used in considerably greater concentrations than the more effective ones such as isobutyl undecylenamide, the morpholides of undecylenic acid, or the piperidide of lauric acid.

Likewise, I prefer to employ aciamides represented by the general formula

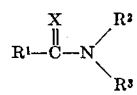

wherein X is oxygen or sulfur, $R^1$ is hydrogen or a hydrocarbon radical, and $R^2$ and $R^3$ are hydrogen or a hydrocarbon residue, and wherein one R is aliphatic and has at least six carbons. The latter R is preferably $R^1$.

The term "hydrocarbon residue" as used above also includes such compounds as the piperidides wherein $R^2$ and $R^3$ are part of the same heterocyclic nucleus and distinguished from the term "hydrocarbon radical" in this respect.

Amides having the preferred structure just discussed and suitable for use in hydrocarbon solutions of pyrethrum are: isobutylamide of octanoic acid, isobutylamide of decanoic acid, isobutylamide of undecanoic acid, isobutylamide of lauric acid, isopropylamide of undecylenic acid, isobutylamide of oleic acid, isobutylamides of Chinawood oil acids, isobutylamides of castor oil acids, isobutylamides of naphthenic acids, isobutylamides of acids obtained by oxidation of petroleum hydrocarbons, isobutylamide of ethyl-n-heptylacetic acid, isobutylamide of n-butyl-n-amylacetic acid, n-dodecylamide of isobutyric acid, dimethylamide of lauric acid, n-dodecylamide of lauric acid, the amide of lauric acid, n-dodecylamide of formic acid, isobutylamide of di-n-heptylacetic acid, the isobutylamide of ethyl-n-butylacetic acid, alpha-naphthylamide of lauric acid, n-dodecylamide of salicylic acid, piperidide of lauric acid, isobutylamide of thiolauric acid, the n-dodecylamide of thioacetic acid, isobutylamide of thiocapric acid, isobutylamide of thiobenzoic acid, n-dodecylamide of thiobenzoic acid, di-cyclohexylamide of oleic acid, piperidide of thiolauric acid, and the amide of thiolauric acid.

Other amides include: tetra-n-butylamide of phthalic acid and di-n-butyldiamide of phthalic acid, the para-methoxy-phenylamide of lauric acid, para-ethoxyphenylamide of lauric acid, n-dodecylamide of alpha-picolinic acid, n-dodecylamide of furoic acid, the di-morpholide of sebasic acid, the morpholide of lauric acid, the morpholide of undecylenic acid, the tetrahydrofurfurylamide of octanoic acid, thiodiphenylamide of lauric acid, the morpholide of oleic acid, decahydroquinolide of lauric acid, morpholides of China wood oil acids, morpholides of soya bean oil acids, morpholide of hexahydrophthalic acid, n-hexylamide of nicotinic acid, n-decylamide of tetrahydrofuroic acid, 5-ethoxy-benzthiazol-1-amide of octanoic acid, 1-octanoyl-2-(3-pyridyl) piperidine, dimorpholide of suberic acid, dimorpholide of azelaic acid, the morpholide of ricinoleic acid, the morpholide of 12-hydroxystearic acid, the amide of thiobenzoic acid, and the amide of thiofuroic acid.

While I have disclosed a number of specific amides, it is to be understood that my invention is in no way restricted thereto but that any aciamide, that is a compound containing an amido carbon linked directly with an amido nitrogen and having a requisite solubility in a pyrethrum solvent, may be employed in this invention.

This application is a continuation-in-part of copending application Serial No. 103,909 and contains common subject matter found in the joint application of Bousquet and Salzberg Serial No. 103,908 filed October 3, 1936.

I claim:

1. An insecticidal composition comprising pyrethrum and an aciamide dissolved in a mutual solvent composed essentially of petroleum hydrocarbons, said aciamide having the structure

wherein X is selected from the group consisting of oxygen and sulfur, $R^1$ is selected from the group consisting of hydrogen and a hydrocarbon radical and $R^2$ and $R^3$ are selected from the group consisting of hydrogen or a hydrocarbon residue and wherein one R is aliphatic and has at least six carbon atoms.

2. An insecticidal spray comprising pyrethrum and an aciamide dissolved in a mutual solvent composed essentially of petroleum hydrocarbons, said amide having the structure

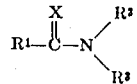

wherein X is selected from the group consisting of oxygen and sulfur, $R^1$ is a hydrocarbon radical containing at least six carbon atoms and $R^2$ and $R^3$ are selected from the group consisting of hydrogen and a hydrocarbon residue.

3. An insecticidal spray comprising pyrethrum and an aciamide dissolved in a mutual solvent composed essentially of petroleum hydrocarbons, said amide having the structure

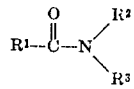

wherein $R^1$ is selected from the group consisting of hydrogen and a hydracarbon radical and $R^2$ and $R^3$ are selected from the group consisting of hydrogen or a hydrocarbon residue and wherein one R is aliphatic and has at least six carbon atoms.

4. An insecticidal spray comprising pyrethrum and an aciamide dissolved in a hydrocarbon solvent, said amide having the structure

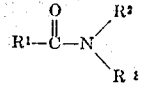

wherein $R^1$ is a hydrocarbon radical containing at least six carbon atoms and $R^2$ and $R^3$ are selected from the group consisting of hydrogen and a hydrocarbon residue.

5. An insecticidal composition comprising pyrethrum and an aciamide having an aliphatic radical of at least six carbon atoms attached to at least one member of the group consisting of amido carbon and amido nitrogen, dissolved in a mutual solvent composed essentially of petroleum hydrocarbons.

6. A fly spray comprising a solution of pyrethrum containing about 25 to 100 milligrams of pyrethrum per 100 cubic centimeters, said solution having dissolved therein an aciamide having an aliphatic radical of at least six carbon atoms attached to at least one member of the group consisting of amido carbon and amido nitrogen.

7. An insecticidal composition comprising a solution of pyrethrum having dissolved therein an aciamide having an aliphatic radical of at least six carbon atoms attached to at least one member of the group consisting of amido carbon and amido nitrogen.

8. An insecticidal composition comprising a solution of pyrethrum having dissolved therein an aciamide having the structure

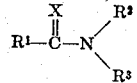

wherein X is selected from the group consisting of oxygen and sulfur, $R^1$ is selected from the group consisting of hydrogen and a hydrocarbon radical and $R^2$ and $R^3$ are selected from the group consisting of hydrogen or a hydrocarbon residue and wherein one R is aliphatic and has at least six carbon atoms.

9. An insecticidal composition comprising a solution of pyrethrum having dissolved therein a carboxylic acid amide having an aliphatic hydrocarbon radical of at least six carbon atoms attached to at least one member of the group consisting of amido carbon and amido nitrogen.

10. An insecticidal composition comprising a solution of pyrethrum having dissolved therein a carboxylic acid amide having the structure

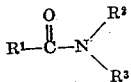

wherein $R^1$ is selected from the group consisting of hydrogen and a hydrocarbon radical and $R^2$ and $R^3$ are selected from the group consisting of hydrogen or a hydrocarbon residue and wherein one R is aliphatic and has at least six carbon atoms.

11. An insecticidal composition comprising a solution of pyrethrum having dissolved therein an amide of an aliphatic carboxylic acid having more than six carbon atoms.

12. An insecticidal composition comprising a solution of pyrethrum having dissolved therein an amide of undecylenic acid.

13. An insecticidal composition comprising a solution of pyrethrum having dissolved therein an amide of lauric acid.

14. An insecticidal composition comprising a solution of pyrethrum having dissolved therein an aciamide containing a heterocyclic radical and having an aliphatic radical of at least six carbon atoms attached to at least one member of the group consisting of amido carbon and amido nitrogen.

15. An insecticidal composition comprising a solution of pyrethrum having dissolved therein a carboxylic acid amide containing a heterocyclic radical and having an aliphatic radical of at least six carbon atoms attached to at least one member of the group consisting of amido carbon and amido nitrogen.

16. An insecticidal composition comprising a solution of pyrethrum having dissolved therein an amide of an aliphatic carboxylic acid having more than six carbon atoms and a heterocyclic amine.

17. An insecticidal composition comprising a solution of pyrethrum having dissolved therein the morpholide of undecylenic acid.

18. An insecticidal composition comprising a solution of pyrethrum having dissolved therein the piperidide of lauric acid.

19. The process for the control of insect pests comprising spraying the insects with a solution of a carboxylic acid amide having an aliphatic hydrocarbon radical of at least eight carbon atoms and pyrethrum.

20. An insecticidal composition comprising a solution of pyrethrum and an amide in a hydrocarbon solvent in which the amide is represented by the formula

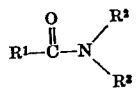

$R^1$, $R^2$ and $R^3$ being selected from the group consisting of hydrogen and aliphatic hydrocarbon radicals and at least one of the R's being an aliphatic hydrocarbon radical having at least eight carbon atoms.

21. A fly spray comprising in solution pyrethruum and an N-substituted amide of an aliphatic carboxylic acid having at least eight carbon atoms.

22. An insecticidal composition comprising a solution of a butylamide of 10,11-undecylenic acid and pyrethrum in a hydrocarbon solvent.

23. An insecticidal spray comprising pyrethrum and isobutylundecylenamide dissolved in a hydrocarbon solvent.

24. A fly spray comprising pyrethrum and isobutylundecylenamide dissolved in kerosene.

EUCLID W. BOUSQUET.